(12) United States Patent
Eguchi et al.

(10) Patent No.: US 11,259,450 B2
(45) Date of Patent: Feb. 22, 2022

(54) METHOD OF DETERMINING DISPOSITION OF COMPONENT SUPPLY UNIT AND APPARATUS FOR DETERMINING DISPOSITION OF COMPONENT SUPPLY UNIT

(71) Applicant: Panasonic Intellectual Property Management Co., Ltd., Osaka (JP)

(72) Inventors: Ryouji Eguchi, Fukuoka (JP); Hiroki Kobayashi, Fukuoka (JP); Daisuke Mizokami, Fukuoka (JP); Takaaki Yokoi, Fukuoka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 483 days.

(21) Appl. No.: 16/357,494

(22) Filed: Mar. 19, 2019

(65) Prior Publication Data
US 2019/0307032 A1 Oct. 3, 2019

(30) Foreign Application Priority Data
Mar. 30, 2018 (JP) .............................. JP2018-067331

(51) Int. Cl.
*H05K 13/02* (2006.01)
*H05K 13/08* (2006.01)
(Continued)

(52) U.S. Cl.
CPC ......... *H05K 13/02* (2013.01); *H05K 13/0417* (2013.01); *H05K 13/086* (2018.08); *G06F 2111/06* (2020.01)

(58) Field of Classification Search
CPC .. H05K 13/02; H05K 13/086; H05K 13/0417; G06F 2111/06
(Continued)

(56) References Cited

U.S. PATENT DOCUMENTS

| 2016/0086790 | A1* | 3/2016 | Maenishi | ......... G05B 19/41805 700/121 |
| 2018/0046736 | A1* | 2/2018 | Sugimoto | ............ H05K 13/085 |
| 2018/0064005 | A1 | 3/2018 | Iisaka | |

FOREIGN PATENT DOCUMENTS

| CN | 107211565 A | 9/2017 |
| WO | 2016/142988 | 9/2016 |

OTHER PUBLICATIONS

English Translation of Chinese Search Report dated Aug. 24, 2021 for the related Chinese Patent Application No. 201910245955.6.

* cited by examiner

*Primary Examiner* — Peter Dungba Vo
*Assistant Examiner* — Azm A Parvez
(74) *Attorney, Agent, or Firm* — Pearne & Gordon LLP

(57) ABSTRACT

A method of determining disposition of a component supply unit including a component reel obtained by winding a component accommodating tape accommodating a component and a tape feeder that supplies the component accommodating tape drawn out from the component reel, for determining component supply unit disposition in which the component supply unit is disposed in a holding unit that holds the component supply unit, includes acquiring component supply unit information including information on the number of the component reel and constraint condition information including information related to a layout that is capable of being selected when the component supply unit is disposed in the holding unit, and determining the component supply unit disposition, based on the constraint condition information and the information on the number of the component reel.

14 Claims, 14 Drawing Sheets

(51) Int. Cl.
*H05K 13/04* (2006.01)
*G06F 111/06* (2020.01)

(58) Field of Classification Search
USPC .................................. 29/740, 739, 729, 700
See application file for complete search history.

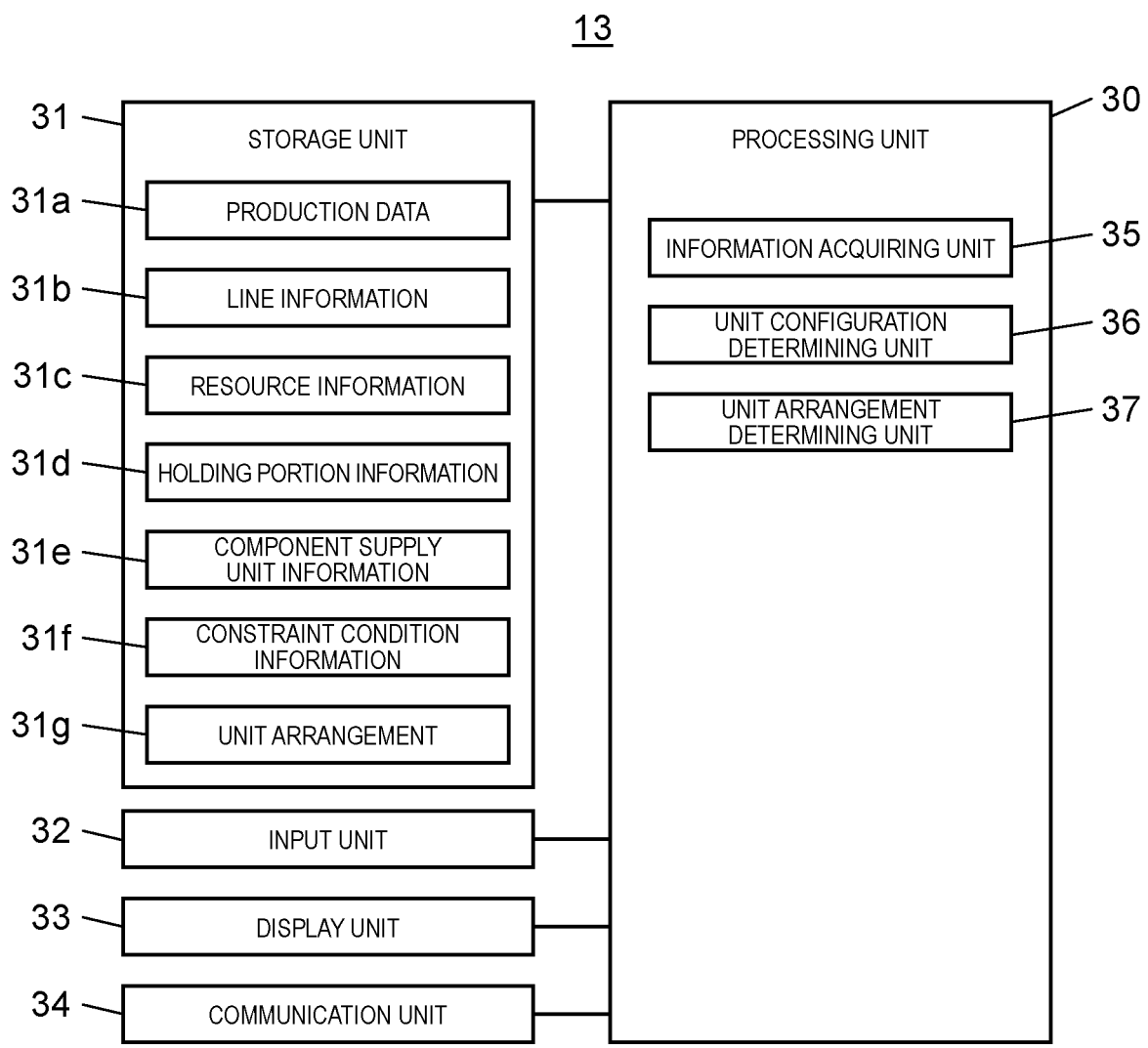

FIG. 8

31c (TAPE FEEDER)

| FEEDER NUMBER | FEEDER TYPE | TRANSPORT TAPE WIDTH | NUMBER OF OCCUPIED SLOTS |
|---|---|---|---|
| FA101 | AUTOMATIC | 4mm | 0.5 |
| FA102 | AUTOMATIC | 4mm | 0.5 |
| ... | ... | ... | ... |
| FA201 | AUTOMATIC | 8mm | 1 |
| ... | ... | ... | ... |
| FM101 | MANUAL | 4mm | 0.5 |
| ... | ... | ... | ... |
| FM201 | MANUAL | 8mm | 1 |
| ... | ... | ... | ... |

31c (COMPONENT REEL)

| REEL NUMBER | REEL DIAMETER | RECEIVING TAPE WIDTH | COMPONENT NAME |
|---|---|---|---|
| RS101 | S | 4mm | D1234 |
| RS102 | S | 4mm | D2345 |
| ... | ... | ... | ... |
| RS201 | S | 8mm | D3456 |
| ... | ... | ... | ... |
| RL101 | L | 4mm | D4567 |
| ... | ... | ... | ... |
| RL201 | L | 8mm | D5678 |
| ... | ... | ... | ... |

| LAYOUT NUMBER | FIRST HOLDING ROW L1 | SECOND HOLDING ROW L2 | THIRD HOLDING ROW L3 | FOURTH HOLDING ROW L4 |
|---|---|---|---|---|
| #1 | S | S | S | S |
| #2 | – | S | S | S |
| #3 | S | – | S | S |
| #4 | S | S | – | S |
| #5 | S | S | S | – |
| #6 | – | – | S | S |
| #7 | – | S | – | S |
| #8 | – | S | S | – |
| #9 | S | – | – | S |
| #10 | S | – | S | – |
| #11 | S | S | – | – |
| #12 | S | – | – | – |
| #13 | – | S | – | – |
| #14 | – | – | S | – |
| #15 | – | – | – | S |
| #16 | S | S | L | – |
| #17 | – | S | L | – |
| #18 | S | – | L | – |
| #19 | – | – | L | – |
| #20 | – | L | S | – |
| #21 | – | L | – | – |
| #22 | – | L | L | – |
| #23 | – | – | L | – |
| #24 | – | – | – | – |

| CONDITION NUMBER | NUMBER OF OCCUPIED SLOTS | NUMBER OF REELS | REEL DIAMETER | MOUNTING-OR-NOT OF REEL HOLDER | NUMBER OF ADJACENT INTERVAL SLOTS |
|---|---|---|---|---|---|
| C001 | 0.5 | 2 | S/S | MOUNTING | 0 |
| C002 | 0.5 | 2 | S/S | DISMOUNTING | 0.5 |
| C003 | 0.5 | 2 | L/L | MOUNTING | 0.5 |
| C004 | 0.5 | 2 | L/L | DISMOUNTING | 1 |
| C005 | 0.5 | 1 | S | MOUNTING | 0 |
| C006 | 0.5 | 1 | S | DISMOUNTING | 0 |
| C007 | 0.5 | 1 | L | MOUNTING | 0 |
| C008 | 0.5 | 1 | L | DISMOUNTING | 0.5 |
| C009 | 1 | 2 | S/S | MOUNTING | 0 |
| C010 | 1 | 2 | S/S | DISMOUNTING | 0 |
| C011 | 1 | 2 | L/L | MOUNTING | 0 |
| C012 | 1 | 2 | L/L | DISMOUNTING | 1 |
| C013 | 1 | 1 | S | MOUNTING | 0 |
| C014 | 1 | 1 | S | DISMOUNTING | 0 |
| C015 | 1 | 1 | L | MOUNTING | 0 |
| C016 | 1 | 1 | L | DISMOUNTING | 0 |
| ... | ... | ... | ... | ... | ... |

| SLOT NUMBER | FEEDER NUMBER |
|---|---|
| S1L | FA101 |
| S1R | – |
| S2L | FA102 |
| S2R | – |
| S3 | – |
| S4 | FA201 |
| S5 | FA202 |
| S6 | – |
| S7L | FM101 |
| S7R | FM102 |
| S8 | – |
| S9 | FM201 |
| S10 | FA203 |
| S11 | – |
| S12 | FA204 |
| S13 | FM202 |
| S14 | FM203 |
| S15L | FA103 |
| S15R | – |
| S16L | FM103 |
| S16R | FM104 |
| S17L | FM105 |
| S17R | FM106 |

↑ 81     ↑ 41

METHOD OF DETERMINING DISPOSITION OF COMPONENT SUPPLY UNIT AND APPARATUS FOR DETERMINING DISPOSITION OF COMPONENT SUPPLY UNIT

BACKGROUND

1. Technical Field

The present disclosure relates to a method of determining disposition of a component supply unit and an apparatus for determining disposition of a component supply unit, which determine disposition of a component supply unit including a component reel and a tape feeder.

2. Description of the Related Art

In a component placement machine that places a component on a board, a plurality of component reels obtained by winding component accommodating tapes accommodating components and a plurality of component supply devices that transport the component accommodating tapes drawn out from the component reels to supply the components are disposed. The component supply devices and the component reels are disposed in a carriage (a holding unit), and the disposition in the holding unit is determined such that productivity of the component placement machine increases. An automatic load feeder that automatically switches to a following component accommodating tape for component replenishment, which is inserted while a component is supplied from a leading component accommodating tape and continues component supply, in addition to a manual load feeder that performs component replenishment by joining a tip end portion of a novel component accommodating tape to a rear end portion of a supplied component accommodating tape by a tape, has been known as the component supply devices (for example, International Publication No. 2016/142988).

Determination of disposition of the component supply devices and the component reels such that a cycle time during which the component is placed on the board is minimized while a replacement time for the component supply devices and the component reels is reduced when the type of the produced board is changed in a state in which the automatic load feeder is fixedly disposed at a center of the holding unit and the manual load feeder is movably disposed at the other position, is disclosed in International Publication No. 2016/142988.

SUMMARY

According to the present disclosure, there is provided a method of determining disposition of a component supply unit including a component reel obtained by winding a component accommodating tape accommodating a component and a tape feeder that supplies the component accommodating tape drawn out from the component reel, for determining component supply unit disposition in which the component supply unit is disposed in a holding unit that holds the component supply unit, the method including: acquiring component supply unit information including information on the number of the component reel and constraint condition information including information related to a layout that is capable of being selected when the component supply unit is disposed in the holding unit; and determining the component supply unit disposition, based on the constraint condition information and the information on the number of the component reel.

According to the present disclosure, there is provided an apparatus for determining disposition of a component supply unit including a component reel obtained by winding a component accommodating tape accommodating a component and a tape feeder that supplies the component accommodating tape drawn out from the component reel, for determining component supply unit disposition in which the component supply unit is disposed in a holding unit that holds the component supply unit, the apparatus including: an information acquiring unit that acquires component supply unit information including information on the number of the component reel and constraint condition information including information related to a layout that is capable of being selected when the component supply unit is disposed in the holding unit; and a unit disposition determining unit that determines the component supply unit disposition, based on the constraint condition information and the information on the number of the component reel.

According to the present disclosure, optimum disposition of a component supply unit including a component reel and a tape feeder can be determined.

BRIEF DESCRIPTION OF THE DRAWINGS

FIG. 7 is a block diagram illustrating a configuration of a management computer (an apparatus for determining disposition of a component supply unit) according to the embodiment of the present disclosure;

FIG. 8 is a table for illustrating an example of resource information of a tape feeder used in the component placement machine according to the embodiment of the present disclosure;

FIG. 9 is a table for illustrating an example of resource information of a component reel used in the component placement machine according to the embodiment of the present disclosure;

FIG. 10 is a table for illustrating an example of information on a layout in which the component reel is disposed in a holding unit according to the embodiment of the present disclosure;

FIG. 12 is a table for illustrating an example of a constraint condition when the tape feeder is disposed in the holding unit according to the embodiment of the present disclosure;

FIG. 13 is a table for illustrating an example of disposition of the component supply unit in which the component supply unit is disposed in the holding unit according to the embodiment of the present disclosure;

DETAILED DESCRIPTION

In the related art disclosed in International Publication No. 2016/142988 as described above, disposition in which an automatic load feeder is fixed to a center of the holding unit is not the best disposition. Further, since disposition of component reels is limited in each automatic load feeder which occupies two component reels, when the automatic load feeder is movably disposed, there is a problem in that extensive manhours are required for an operation of determining disposition of the component reels and the automatic load feeder.

An object of the present disclosure is to provide a method of determining disposition of a component supply unit and an apparatus for determining disposition of a component supply unit, which can determine optimum disposition of a component supply unit including a component reel and a tape feeder.

Figure 1:
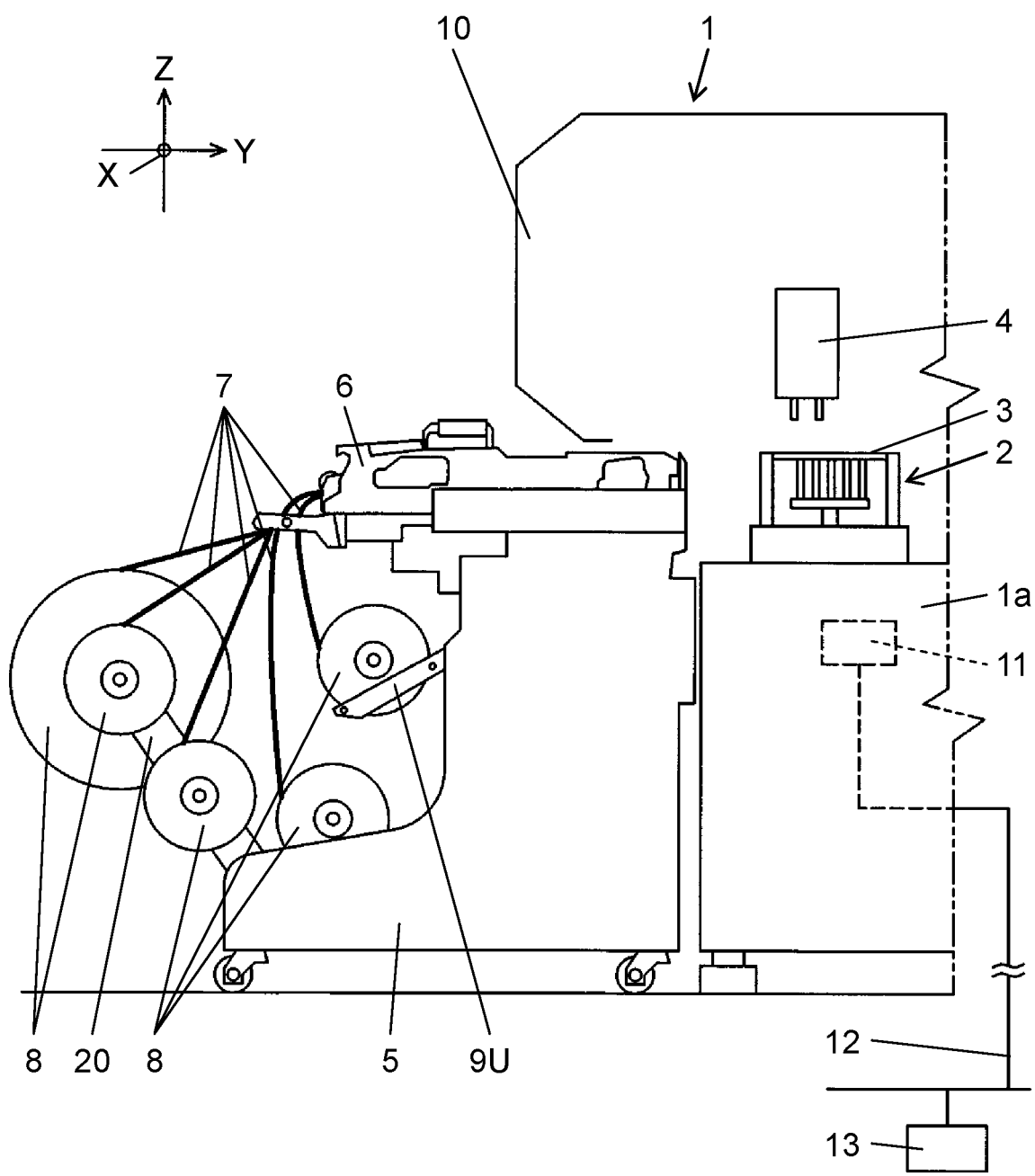
FIG. 1 is a diagram for illustrating a configuration of a component placement machine according to an embodiment of the present disclosure.

An embodiment of the present disclosure will be described in detail with reference to the following drawings. Configurations, shapes, and the like described below are examples for explanation, and can be appropriately changed in accordance with specifications of a component placement machine, a tape feeder, a carriage, a component reel, and the like. Hereinafter, corresponding elements in all the drawings are designated by the same reference numerals, and duplicated description will be omitted. In FIG. 1 and a part described below, an X direction (a direction that is perpendicular to a paper surface in FIG. 1) in a board transport direction and a Y direction (a left-right direction in FIG. 1) that is perpendicular to the board transport direction are shown as two axis directions that perpendicular to each other in a horizontal plane. Further, a Z direction (an up-down direction in FIG. 1) is shown as a height direction that is perpendicular to a horizontal plane.

First, a configuration of component placement machine 1 will be described with reference to FIG. 1. Component placement machine 1 functions to manufacture a placement board on which a component is loaded. Board transport mechanism 2 provided on an upper surface of base 1a transports board 3 in the X direction to determine and hold a position of board 3. Mounting head 4 that moves in a horizontal direction (the X direction and the Y direction) by a not-illustrated head moving mechanism is installed above board transport mechanism 2.

A plurality of tape feeders 6 are provided at an upper portion of carriage 5 coupled to base 1a on a lateral side of board transport mechanism 2 side by side in the X direction. Tape feeders 6 are a component supply device that transports component accommodating tapes 7 drawn out from component reels 8, on which component accommodating tapes 7 accommodating the component to be supplied to component placement machine 1 is wound, in a tape feeding direction, and supplies the component to a component pickup position by mounting head 4.

A plurality of upper reel holding units 9U aligned in the X direction and a plurality of lower reel holding units 9B aligned in the X direction are vertically provided on a front side of carriage 5 and below tape feeders 6 (see FIG. 2). Upper reel holding units 9U and lower reel holding units 9B rotatably hold component reels 8, respectively. A plurality of reel holders 20 are mounted in front of lower reel holding units 9B side by side in the X direction. Reel holders 20 can be detachably attached to carriage 5 and can hold the plurality of component reels 8. Carriage 5 is detachably attached to component placement machine 1, and a plurality of types of holdable tape feeders 6 having different amounts and a plurality of types of component reels 8 having different amounts are prepared depending on mounted component placement machine 1.

In FIG. 1, openable/closeable body cover 10 that performs covering to prevent a worker from touching a movable mechanism such as mounting head 4 during a component placement operation is installed above carriage 5. Component placement machine 1 includes mounting controller 11 that controls board transport mechanism 2, mounting head 4, and the head moving mechanism. Mounting controller 11 transmits a component supply command to tape feeders 6, controls mounting head 4 and head moving mechanism, picks up, by mounting head 4, the component supplied to the component pickup position by tape feeders 6, and executes a component placing operation of transporting and placing to the component placement position of board 3 held on board transport mechanism 2.

Mounting controller 11 is connected to management computer 13 via wired or wireless communication network 12, and can transmit/receive data to/from management computer 13. Management computer 13 manages production of a mounting board manufactured in a component mounting line including component placement machine 1, manages resources such as carriage 5, tape feeders 6, and component reels 8 used in component mounting line, determines disposition of tape feeders 6 on carriage 5, and determines disposition of component reels 8 on carriage 5 and reel holders 20.

Next, a configuration and a function of carriage 5 according to the present embodiment will be described with reference to FIG. 2. Feeder mounting portion 5a is installed at an upper portion of carriage 5. A plurality of (here, 17) slots S1 to S17 on which tape feeders 6 are mounted are formed on an upper surface of feeder mounting portion 5a at regular intervals in the board transport direction (the X direction) while being mounted on component placement machine 1. One standard tape feeder 6L and two thin tape feeders 6S can be mounted in one slot S. Two thin tape feeders 6S are mounted on slot S15. For convenience, in slot S15, a position of thin tape feeder 6S on the left side is referred to as slot S15L and a position of thin tape feeder 6S on the right side is referred to as slot S15R.

Figure 2:
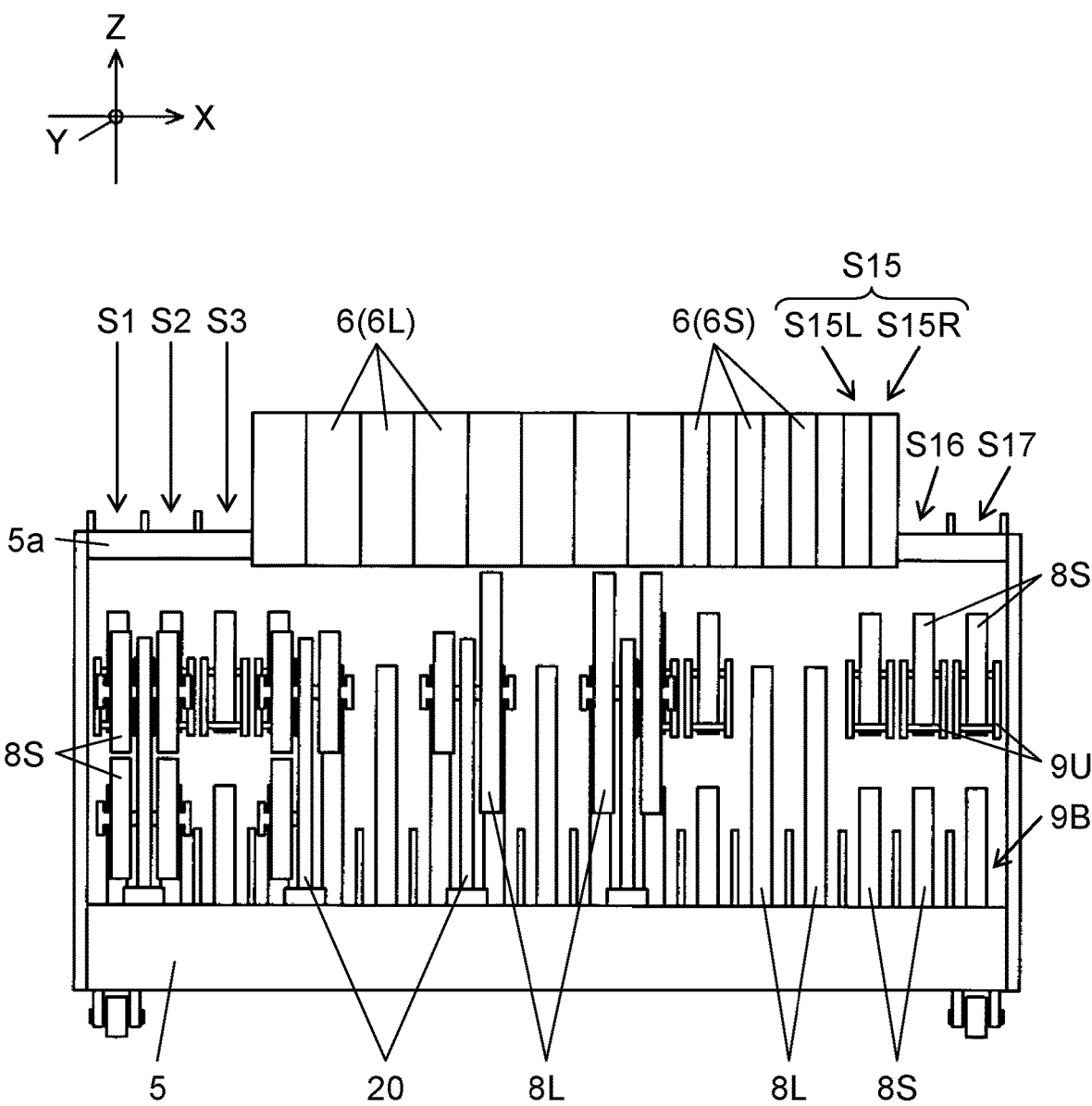
FIG. 2 is a diagram for illustrating a configuration of a carriage mounted on the component placement machine according to the embodiment of the present disclosure.

In FIG. 2, a plurality of (here, 17) lower reel holding units 9B are formed below feeder mounting portion 5a at regular intervals in the X direction to correspond to the positions of slots S1 to S17. A plurality of (maximally, 17) upper reel holding units 9U can be mounted between feeder mounting portion 5a and lower reel holding units 9B at regular intervals in the X direction to correspond to the positions of slots S1 to S17. Upper reel holding units 9U are detachable, and can each have one small component reel 8S having a small reel diameter.

Lower reel holding units 9B can each have one small component reel 8S or one large component reel 8L having a large reel diameter. When large component reel 8L is held on lower reel holding unit 9B, upper reel holding unit 9U cannot be mounted at a position of the same slot S which interferes with held large component reel 8L. That is, when large component reel 8L is held on lower reel holding unit 9B, small component reel 8S cannot be held at a position where upper reel holding unit 9U can be mounted at same slot S.

In FIG. 2, reel holder 20 is mounted on a front side of lower reel holding unit 9B and between slots S. Reel holder 20 mounted on carriage 5 can hold two small component reels 8S on the left and right sides or one large component reel 8L. A position of small component reels 8S or large component reel 8L held by reel holder 20 is a position of any one of left and right slots S at a position (between slots S) where reel holder 20 is mounted.

For example, a position of component reel 8 on which reel holder 20 mounted between a position of slot S1 and a position of slot S2 is held is a position of slot S1 or a position of slot S2. Reel holder 20 is mounted on carriage 5 with a gap which is apart from a space between component reels 8 mounted on left and right reel holders 20 and where the worker can perform working.

Figure 3A:
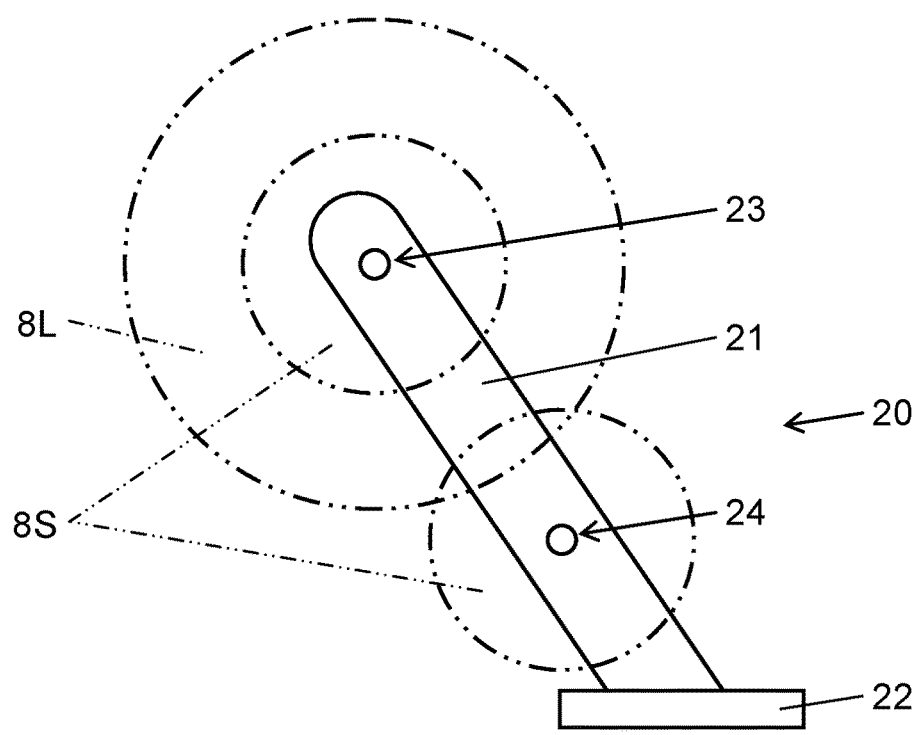
FIG. 3A is a diagram for illustrating a reel holder mounted on the carriage according to the embodiment of the present disclosure.
Figure 3B:
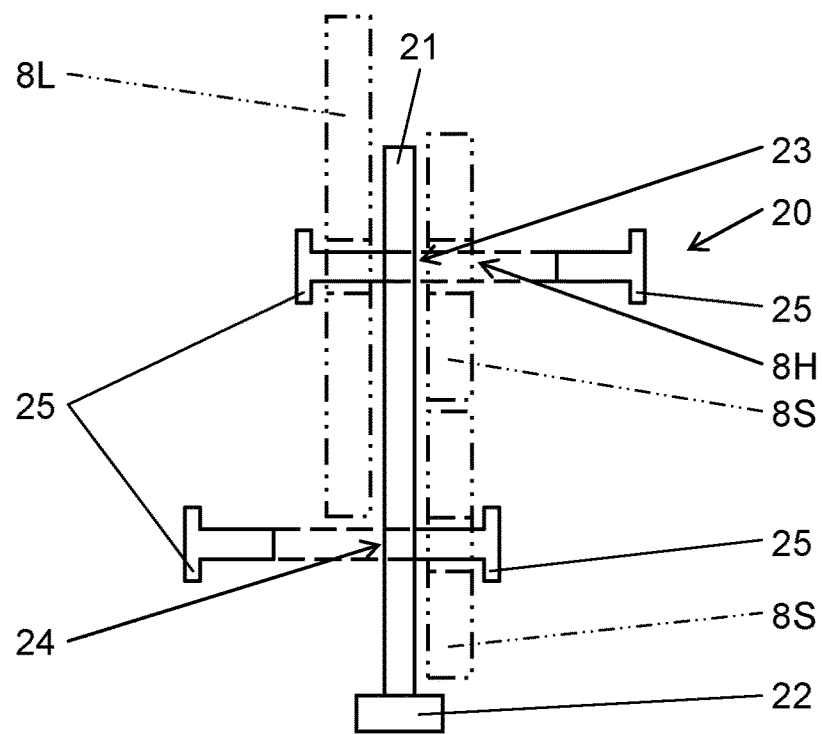
FIG. 3B is a diagram for illustrating the reel holder mounted on the carriage according to the embodiment of the present disclosure.

Next, a configuration and a function of reel holder 20 will be described with reference to FIGS. 3A and 3B. Reel holder 20 includes plate-shaped arm portion 21 and mounting portion 22. Reel holder 20 is fixed to carriage 5 by mounting portion 22 on carriage 5. Arm portion 21 extends upward from an upper portion of mounting portion 22. Arm portion 21 is inclined outward in a state in which reel holder 20 is mounted on carriage 5. Upper pin installation hole 23 and lower pin installation hole 24 are vertically formed at arm portion 21. Reel holding pins 25 are inserted through left and right sides of upper pin installation hole 23 and lower pin installation hole 24. Core holes 8H formed at centers of small component reels 8S and large component reel 8L can be inserted into reel holding pins 25.

Reel holding pin 25 inserted into lower pin installation hole 24 can hold small component reel 8S. Reel holding pin 25 inserted into upper pin installation hole 23 can hold small component reel 8S and large component reel 8L. Hereinafter, when there is no need to distinguish small component reels 8S from large component reel 8L, small component reels 8S and large component reel 8L are referred to as component reel 8. Further, the position of reel holding pin 25 inserted into upper pin installation hole 23 is referred to as an upper holding position of reel holder 20, and the position of reel holding pin 25 inserted into lower pin installation hole 24 is referred to as a lower holding position of reel holder 20.

Figure 4A:
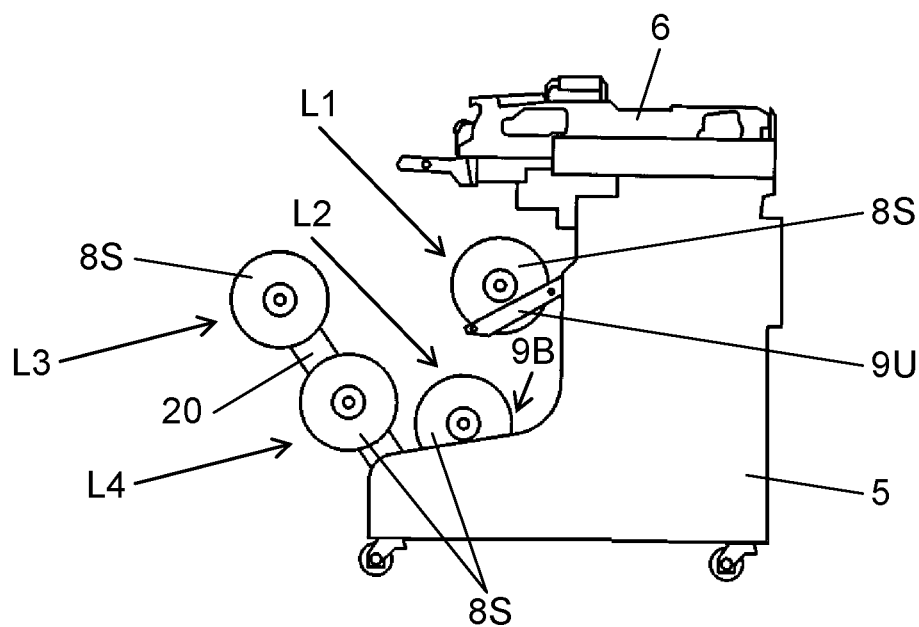
FIG. 4A is a diagram for illustrating an example of a layout in which a component reel is disposed in the carriage according to the embodiment of the present disclosure.

Next, an example of a layout that can be selected when component reel 8 is disposed in carriage 5 or reel holder 20 mounted on carriage 5 will be described with reference to FIGS. 4A, 4B, 5A, and 5B. FIG. 4A illustrates a layout in which small component reels 8S are held on upper reel holding unit 9U and lower reel holding unit 9B located at a position of the same slot S, and the upper holding position and the lower holding position of reel holder 20, respectively. Hereinafter, a plurality of upper reel holding units 9U aligned in an disposition direction (the X direction) of tape feeders 6 are referred to as first holding row L1, a plurality of lower reel holding units 9B aligned in the disposition direction (the X direction) of tape feeders 6 are referred to as second holding row L2, upper holding positions of a plurality of reel holders 20 aligned in the disposition direction (the X direction) of tape feeders 6 are referred to as third holding row L3, and lower holding positions of a plurality of reel holders 20 aligned in the disposition direction (the X direction) of tape feeders 6 are referred to as fourth holding row L4.

Figure 4B:
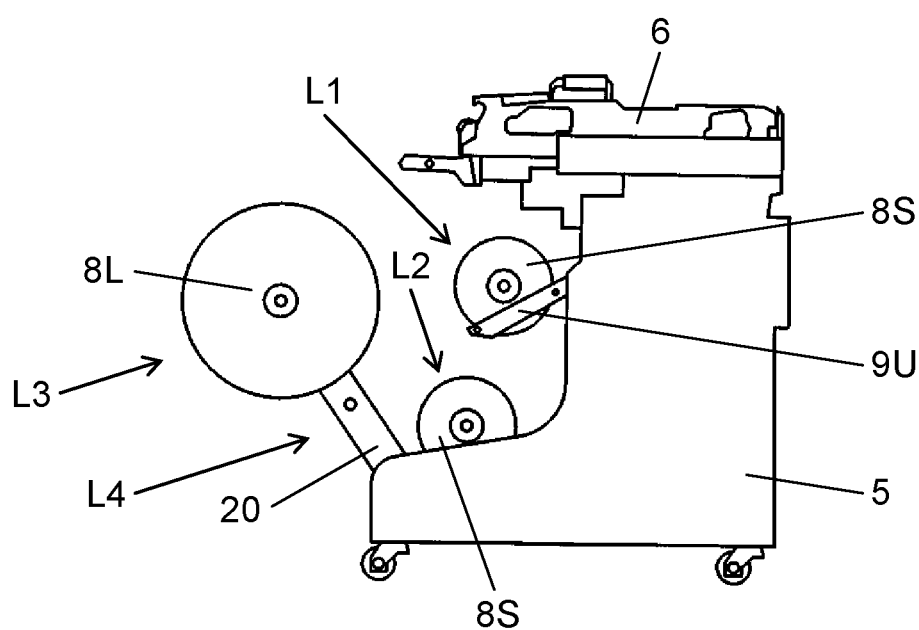
FIG. 4B is a diagram for illustrating an example of a layout in which the component reel is disposed in the carriage according to the embodiment of the present disclosure.

FIG. 4B illustrates a layout in which small component reels 8S are held on first holding row L1 and second holding row L2 located at the position of the same slot S, and large component reel 8L is held on third holding row L3. When large component reel 8L is held on third holding row L3, since large component reel 8L and component accommodating tapes 7 may interfere with each other, component reel 8 cannot be held on fourth holding row L4 located at the position of the same slot S.

Figure 5A:
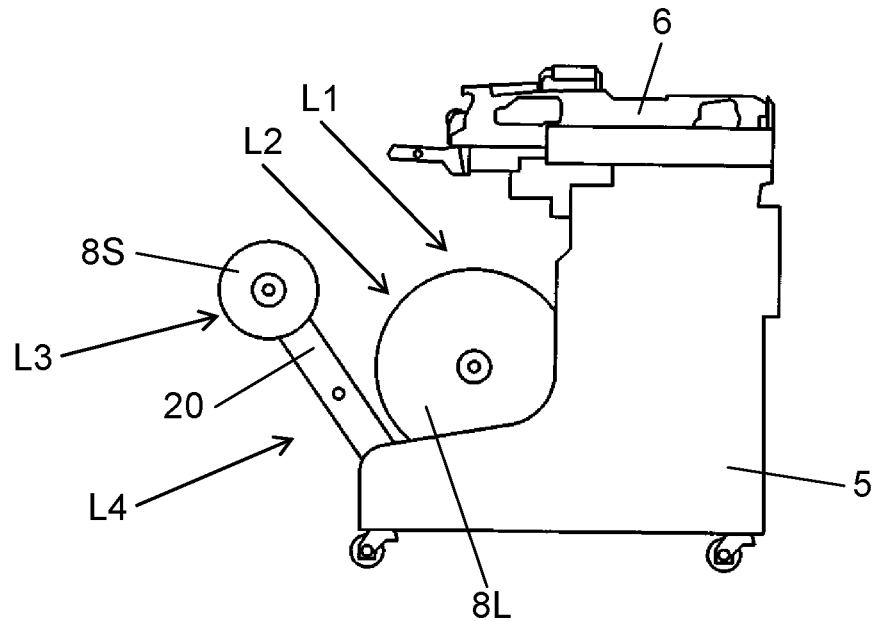
FIG. 5A is a diagram for illustrating an example of a layout in which the component reel is disposed in the carriage according to the embodiment of the present disclosure.
Figure 5B:
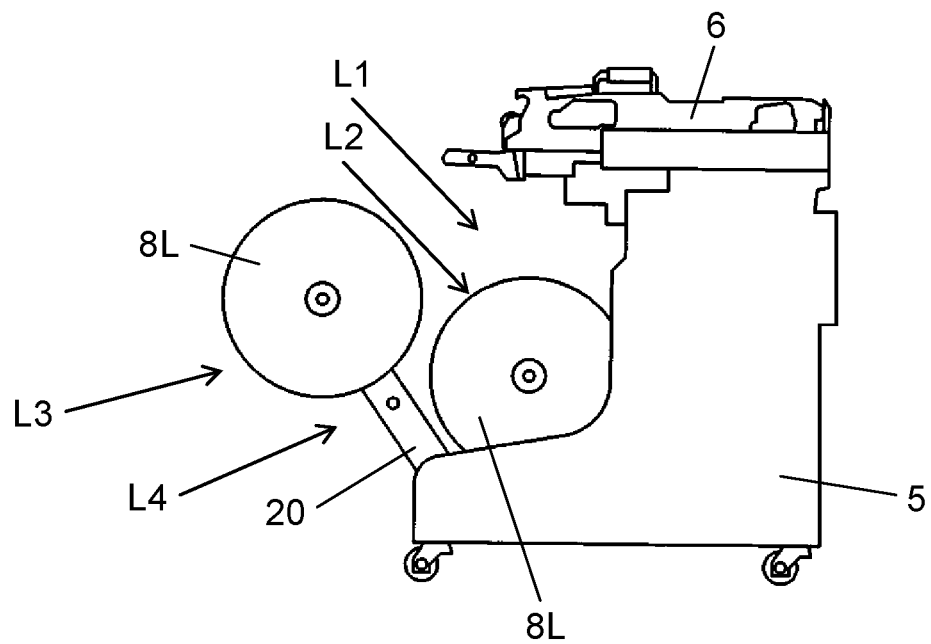
FIG. 5B is a diagram for illustrating an example of a layout in which the component reel is disposed in the carriage according to the embodiment of the present disclosure.

FIG. 5A illustrates a layout in which large component reel 8L is held on second holding row L2 located at the position of the same slot S and small component reel 8S is held on third holding row L3. FIG. 5B illustrates a layout in which large component reel 8L is held on second holding row L2 located at the position of the same slot S and large component reel 8L is held on third holding row L3. When large component reel 8L is held on second holding row L2, since large component reel 8L and component accommodating tapes 7 may interfere with each other, component reel 8 cannot be held on first holding row L1 and fourth holding row L4 located at the position of the same slot S.

In this way, holding rows L1 to L4 hold a plurality of component reels 8. Thus, carriage 5 and reel holder 20 mounted on carriage 5 constitute a holding unit having the plurality of holding rows L1 to L4. Further, a layout that can be selected when component reel 8 is disposed in the holding unit changes depending on a reel diameter of component reel 8 disposed in the holding unit.

Figure 6A:
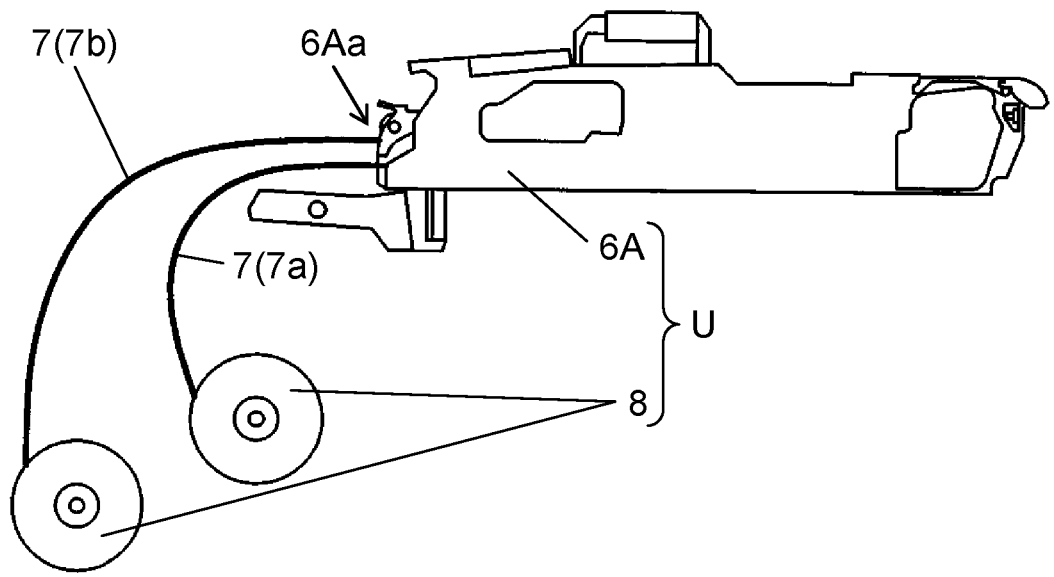
FIG. 6A is a diagram for illustrating an automatic load feeder mounted on the carriage according to the embodiment of the present disclosure.

Next, automatic load feeder 6A and manual load feeder 6M which are tape feeders 6 used while being mounted on carriage 5 will be described with reference to FIGS. 6A and 6B. In FIG. 6A, component accommodating tapes 7 (hereinafter, referred to as "leading tape 7a") that supply the component to the component pickup position are inserted into automatic load feeder 6A from insertion port 6Aa. In replenishment of components, the worker pulls component accommodating tape 7 (hereinafter, referred to as "following tape 7b") from component reel 8 for component replenishment and inserts component accommodating tape 7 into an upper portion of insertion port 6Aa into which leading tape 7a is inserted.

When supply of the component is continuously performed and the component of leading tape 7a is run out, automatic load feeder 6A automatically switches component accommodating tape 7 supplying the component to following tape 7b to continue the supply of the component. In this way, automatic load feeder 6A automatically switches and supplies the plurality of component accommodating tapes 7 (leading tape 7a and following tape 7b) drawn out and inserted from the plurality of component reels 8.

Figure 6B:
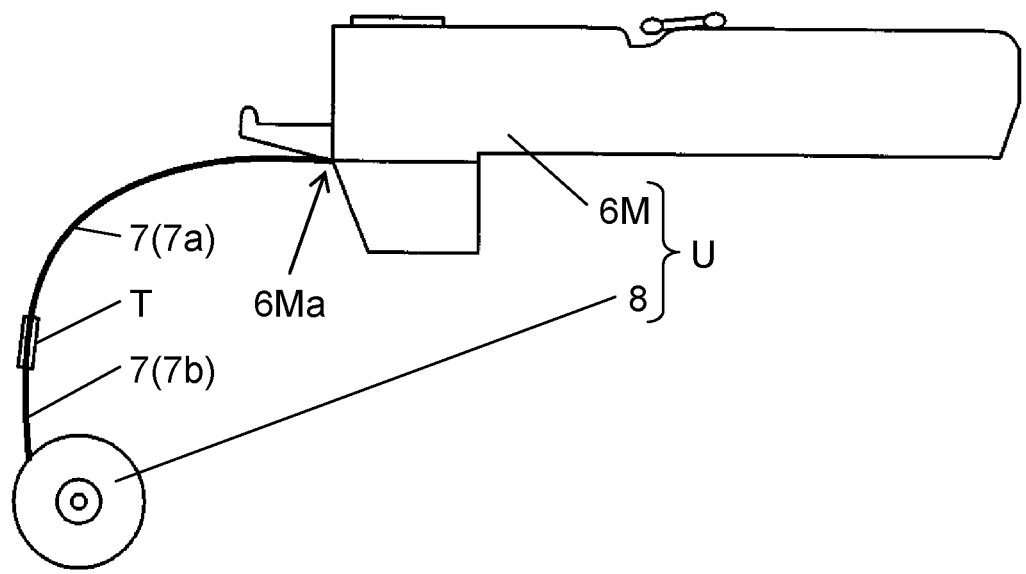
FIG. 6B is a diagram for illustrating a manual load feeder mounted on the carriage according to the embodiment of the present disclosure.

In FIG. 6B, in manual load feeder 6M, leading tape 7a is inserted from insertion port 6Ma, and the component is supplied to the component pickup position. When remaining leading tape 7a inserted from insertion port 6Ma becomes small, the worker replenishes the component. In the replenishment of components, the worker pulls out following tape 7b from component reel 8 for component replenishment, and joins a tip end portion of following tape 7b to a rear end portion of leading tape 7a through splicing tape T. Joined following tape 7b is transported to manual load feeder 6M subsequent to leading tape 7a, so that the supply of the component continues.

Automatic load feeder 6A and manual load feeder 6M are prepared in a plurality of types such as a standard type or a thin type to correspond to a tape width of component accommodating tape 7 to be transported. Hereinafter, when there is no need to distinguish the tape width of component accommodating tape 7 to be transported, automatic load feeder 6A and manual load feeder 6M are simply referred to as tape feeder 6.

In FIGS. 6A and 6B, component reel 8 accommodating tape feeder 6 and component accommodating tape 7 inserting (or inserted) into tape feeder 6 constitutes component supply unit U that supplies the component to component placement machine 1. Thus, the holding unit (carriage 5 and reel holder 20) that holds a plurality of tape feeders 6 and a plurality of component reels 8 is a holding unit that holds a plurality of component supply units U. That is, the holding unit holds the plurality of component supply units U. Component supply unit U is configured with at least one component reel 8 and tape feeder 6. Component accommodating tape 7 is wound on component reel 8. Tape feeder 6 is drawn out from at least one component reel 8, and supplies component accommodating tape 7 inserted into tape feeder 6.

In FIG. 6A, automatic load feeder 6A and two component reels 8 on which leading tape 7a and following tape 7b inserted into automatic load feeder 6A are wound constitute component supply unit U. In FIG. 6B, manual load feeder 6M and not-illustrated component reel 8 accommodating leading tape 7a inserted into manual load feeder 6M constitute component supply unit U. Further, component reel 8 that is set in the holding unit in advance for supplying the component to tape feeder 6 also constitutes component supply unit U. In FIG. 6B, component reel 8 accommodating following tape 7b also constitutes component supply unit U.

Next, a configuration of a processing system of management computer 13 will be described with reference to FIG. 7. Management computer 13 includes processing unit 30, storage unit 31, input unit 32, display unit 33, and communication unit 34. Input unit 32, which is an input device such as a keyboard, a touch panel, and a mouse, is used when various commands, data, and the like, are input. Display unit 33, which is a display device such as a liquid crystal panel, displays various data and an input screen. Communication unit 34, which is a communication interface, transmits/receives, through communication network 12, data to/from a device constituting a component mounting line including component placement machine 1.

Storage unit 31, which is a storage device, stores production data 31a, line information 31b, resource information 31c, holding unit information 31d, component supply unit information 31e, constraint condition information 31f, unit disposition 31g, and the like. The processing unit 30 includes, as an internal processing unit, information acquiring unit 35, unit configuration determining unit 36, and unit disposition determining unit 37.

Production data 31a includes information necessary for mounting the component on board 3, such as the number of produced boards 3, a component name (a type) of the component mounted on board 3, and a mounting position (XY coordinates), according to each type of a mounting board to be produced. Line information 31b includes information on a device constituting the component mounting line, such as types of mounting head 4 or carriage 5 that can be mounted on component placement machine 1. Resource information 31c includes information on types of resources such as carriage 5, tape feeder 6, and component reel 8 used in the component mounting line or the number of available resources.

Here, an example of resource information 31c related to tape feeder 6 will be described with reference to FIG. 8. Resource information 31c related to tape feeder 6 includes "feeder number" 41, "feeder type" 42, "transport type width" 43, and "number of occupied slots" 44. "Feeder number" 41 is a number for specifying tape feeder 6. "Feeder type" 42 indicates whether tape feeder 6 is automatic load feeder 6A (auto) or manual load feeder 6M (manual).

"Transport tape width" 43 denotes a tape width of component accommodating tape 7 transported by tape feeder 6. "Number of occupied slots" 44 denotes the number of slots S occupied when tape feeder 6 is mounted on feeder mounting portion 5a of carriage 5. For example, tape feeder 6 having "feeder number" 41 of "FA101" is automatic load feeder 6A that occupies only 0.5 slot of feeder mounting portion 5a and transports component accommodating tape 7 having a tape width of 4 mm.

Next, an example of resource information 31c related to component reel 8 will be described with reference to FIG. 9. Resource information 31c related to component reel 8 includes "reel number" 45, "reel diameter" 46, "accommodating tape width" 47, and "component name" 48. "Reel number" 45 is a number for specifying component reel 8. "Reel diameter" 46 is information for specifying a reel diameter of component reel 8. In this example, "S" indicates a small diameter (small component reel 8S), and "L" indicates a large diameter (large component reel 8L).

"Accommodating tape width" 47 indicates a tape width of component accommodating tape 7 wound and accommodated on component reel 8. "Component name" 48 is a component name for specifying a component accommodated in component accommodating tape 7. For example, component reel 8 having "reel number" 45 of "RS101" is small component reel 8S, which accommodates component accommodating tape 7 having a tape width of 4 mm, in which the component of which a component name is "D1234" is accommodated.

In FIG. 7, holding unit information 31d includes information on a layout that can be selected when component reel 8 is disposed in the holding unit according to each type of the holding unit (carriage 5 and reel holder 20). Here, an example of holding unit information 31d will be described with reference to FIG. 10. Holding unit information 31d illustrated in FIG. 10 indicates a combination (a layout) of component reel 8 that can be held on first holding row L1, second holding row L2, third holding row L3, and fourth holding row L4 at the positions of the holding units illustrated in FIGS. 4A 4B, 5A, and 5B in the same slot S. Holding unit information 31d includes "layout number" 51, "first holding row L1" 52, "second holding row L2" 53, "third holding row L3" 54, and "fourth holding row L4" 55.

"Layout number" 51 is a number for specifying the combination (the layout) of component reel 8. "First holding row L1" 52, "second holding row L2" 53, "third holding row L3" 54, and "fourth holding row L4" 55 indicate whether component reel 8 held in each of holding rows L1 to L4 is small component reel 8S (5) or large component reel 8L (L) or component reel 8 is not held (−). For example, a layout having "layout number" 51 of "#1" corresponds to the layout illustrated in FIG. 4A where small component reel 8S is held in all the holding rows L1 to L4. Similarly, a layout having "layout number" 51 of "#16" corresponds to the layout of FIG. 4B, a layout having "layout number" 51 of "#20" corresponds to the layout of FIG. 5A, and a layout having "layout number" 51 of "#22" corresponds to the layout of FIG. 5B.

In FIG. 7, information acquiring unit 35 acquires various kinds of information for determining component supply unit U necessary for production of the mounting board from production data 31a and resource information 31c stored in storage unit 31. Unit configuration determining unit 36 determines a combination of tape feeder 6 and component reel 8 constituting component supply unit U based on acquired various kinds of information. In more detail, unit configuration determining unit 36 determines a plurality of component supply units U necessary for production in consideration of the number of components mounted on the mounting board, the tape width of component accommodating tape 7 accommodating the component, and the kind of tape feeder 6, and stores the plurality of component supply units U as component supply unit information 31e in storage unit 31.

Figure 11:
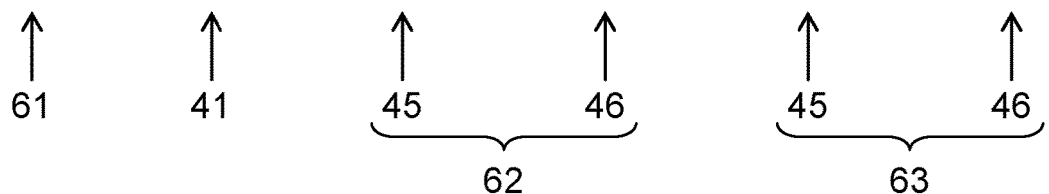
FIG. 11 is a table for illustrating an example of the component supply unit disposed in the holding unit according to the embodiment of the present disclosure.

Here, an example of component supply unit information 31e created based on resource information 31c illustrated in FIGS. 8 and 9 will be described with reference to FIG. 11. Component supply unit information 31e is stored such that "feeder number" 41 for specifying tape feeder 6, "leading reel" 62 corresponding to information on component reel 8 accommodating leading tape 7a, and "following reel" 63 corresponding to information on component reel 8 accommodating following tape 7b correspond to "unit number" 61 for specifying component supply unit U. "Leading reel" 62 includes "reel number" 45 for specifying component reel 8 accommodating leading tape 7a and "reel diameter" 46 for specifying a reel diameter.

"Following reel" 63 includes "reel number" 45 for specifying component reel 8 accommodating following tape 7b and "reel diameter" 46 for specifying a reel diameter. For example, component supply unit U having "unit number" 61 of "U101" is configured with automatic load feeder 6A having "feeder number" 41 of "FA101", small component reel 8S accommodating leading tape 7a and having "reel number" 45 of "RS101", and small component reel 8S accommodating following tape 7b and having "reel number" 45 of "RS103". In this way, component supply unit information 31e includes the number of component reels 8 constituting component supply unit U and information on the reel diameter.

When tape feeder 6 constituting component supply unit U is automatic load feeder 6A, following tape 7b on which component reel 8 that becomes a following reel is wound is inserted into insertion port 6Aa together with leading tape 7a. When tape feeder 6 constituting component supply unit U is manual load feeder 6M, following tape 7b on which component reel 8 that becomes the following reel is wound is joined to leading tape 7a or is held in the holding unit as it is.

In FIG. 7, constraint condition information 31f includes information on a layout (a constraint condition) that can be selected when component supply unit U is disposed in the holding unit, according to each type of the holding unit. Here, an example of a constraint condition related to disposition of tape feeder 6 when component supply unit U is disposed in the holding unit illustrated in FIGS. 4A, 4B, 5A, and 5B will be described with reference to FIG. 12. Constraint condition information 31f related to the disposition of tape feeder 6 is stored such that "number of occupied slots" 44, "number of reels" 72, "reel diameter" 73, "mounting-or-not of a reel holder" 74, and "adjacent interval slot number" 75 correspond to "condition number" 71 for specifying a constraint condition.

"Number of occupied slots" 44 is the number of slots S occupied by tape feeder 6 constituting component supply unit U. "Number of reels" 72 is the number of component reels 8 constituting component supply unit U, and "reel diameter" 73 is information for specifying a reel diameter of component reel 8. For example, "S/S" means that both component reels 8 are small component reels 8S, and "L/L" means that both component reels 8 are large component reels 8L. "Mounting-or-not of a reel holder" 74 indicates whether or not reel holder 20 is mounted (exists or not) on a position of the corresponding slot S of the carriage 5.

"Adjacent interval slot number" 75 is a constraint condition when tape feeders 6 are disposed in the holding unit, and indicates the number of slots S emptied between adjacent tape feeders 6. The number of slots S emptied between adjacent tape feeders 6 is determined by a layout (holding unit information 31d) that can be selected when component reel 8 is disposed in the holding unit, and depends on the number of holding rows L1 to L4 of the holding unit, the reel diameter of component reel 8 that can be held by holding rows L1 to L4, and the like.

In FIG. 12, for example, a constraint condition having "condition number" 71 of "C002" corresponds to a case where component supply unit U configured with thin tape feeder 6S (automatic load feeder 6A or manual load feeder 6M) of which the width of occupied slot S is 0.5 and two small component reels 8S is disposed in the holding unit without reel holder 20 mounted, and indicates that it is necessary to empty an interval between adjacent tape feeders 6, which corresponds to slot number "0.5".

In FIG. 7, information acquiring unit 35 acquires various kinds of information for determining component supply unit disposition in which component supply unit U is disposed in the holding unit, from line information 31b, resource information 31c, component supply unit information 31e, and constraint condition information 31f stored in storage unit 31. Unit disposition determining unit 37 determines the component supply unit disposition based on various kinds of acquired information, and stores the determined component supply unit disposition as unit disposition 31g in storage unit 31. In more detail, unit disposition determining unit 37 allocates tape feeder 6 to slot S of carriage 5 to satisfy constraint condition information 31f, based on the number of slots S occupied by tape feeder 6 constituting component supply unit U, the number of component reels 8, and the reel diameter of component reel 8, included in component supply unit information 31e.

The component supply unit disposition is created according to each carriage 5 (each holding unit) mounted on a device (component placement machine 1) constituting the component mounting line. Further, unit disposition determining unit 37 causes the determined component supply unit disposition to be displayed on display unit 33 or a portable terminal (not illustrated) carried by the worker. Further, when there is component supply unit U that cannot be disposed, unit disposition determining unit 37 notifies the fact to display unit 33 or the portable terminal.

Here, an example of unit disposition 31g in which tape feeder 6 is allocated to the holding unit (carriage 5) illustrated in FIGS. 4A, 4B, 5A, and 5B based on component supply unit information 31e illustrated in FIG. 11 and constraint condition information 31f illustrated in FIG. 12 will be described with reference to FIG. 13. This example is the component supply unit disposition created under a condition in which component supply unit U is disposed in carriage 5 having 17 slots S without reel holder 20 mounted. Unit disposition 31g includes "slot number" 81 for specifying a position of slot S of carriage 5 and "feeder number" 41 for specifying tape feeder 6 mounted on slot S.

In FIG. 13, automatic load feeder 6A having "feeder number" 41 of "FA101", which constitutes component supply unit U having "unit number" 61 of "U101", is allocated to slot S having "slot number" 81 of "S1L". "Condition number" 71 of constraint condition information 31f corresponding to component supply unit U having "unit number" 61 of "U101" is "C002", and it is necessary to make "adjacent interval slot number" 75 be emptied equal to or more than "0.5". Here, unit disposition determining unit 37 allocates automatic load feeder 6A having "feeder number" 41 of "FA102", which constitutes component supply unit U having "unit number" 61 of "U102", to slot S having "slot number" 81 of "S2L" in which "0.5" of slot S is emptied.

In this way, unit disposition determining unit 37 determines an interval at which tape feeder 6 constituting component supply unit U is disposed in the holding unit, based on constraint condition information 31f, the number of component reels 8, the reel diameter, and the reel diameter of component reel 8 that can be held on each of plurality of holding rows L1 to L4 of the holding unit.

Further, unit disposition determining unit 37 executes optimization such as allocating reel holder 20 to a position of slot S where there is empty slot S to increase the number of tape feeders 6 mounted on carriage 5 or changing positions of tape feeders 6 of carriage 5 to increase productivity of a component mounting operation. In the optimization for increasing the productivity of the component mounting operation, a widely-known technology can be used.

Figure 14:
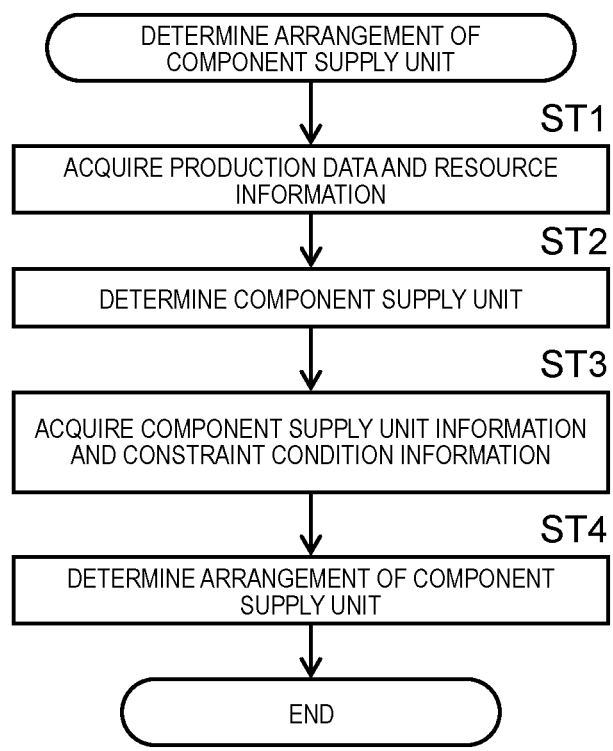
FIG. 14 is a flowchart illustrating a method of determining disposition of the component supply unit according to the embodiment of the present disclosure.

Next, a method of determining disposition of a component supply unit, which determines component supply unit disposition, will be described along flow of FIG. 14. First, information acquiring unit 35 acquires production data 31a and resource information 31c (ST1). Next, unit configuration determining unit 36 determines component supply unit U used for production based on the acquired information, and stores as component supply unit information 31e (ST2).

Next, information acquiring unit 35 acquires component supply unit information 31e and constraint condition information 31f (ST3). Next, unit disposition determining unit 37 determines an interval at which tape feeder 6 constituting component supply unit U is disposed in the holding unit and determines the component supply unit disposition, based on constraint condition information 31f, the number of component reels 8, the reel diameter, and the reel diameter of component reel 8 that can be held on each of holding rows L1 to L4 of the holding unit (ST4). Unit disposition determining unit 37 stores the determined component supply unit disposition as unit disposition 31g, and displays the component supply unit disposition on display unit 33 or the portable terminal. Further, when there is component supply unit U that cannot be disposed, unit disposition determining unit 37 notifies the fact to display unit 33 or the portable terminal.

Figure 15A:
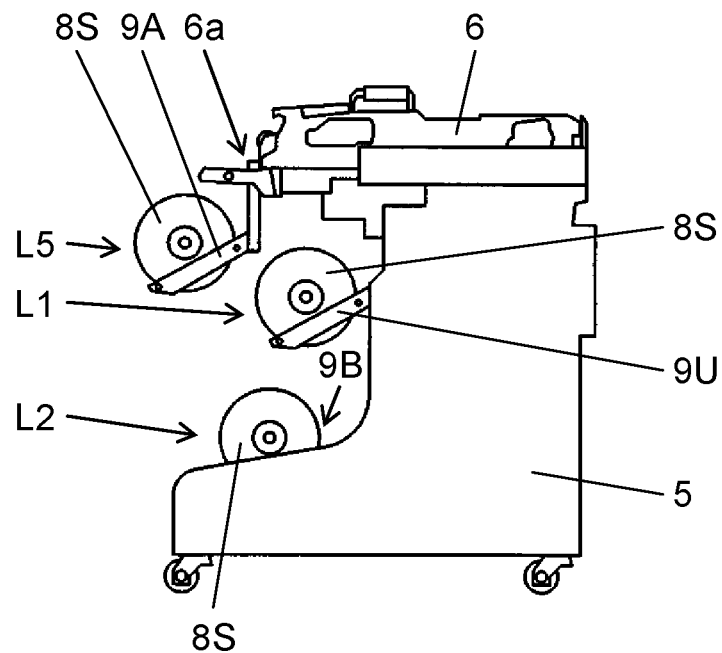
FIG. 15A is a diagram for illustrating another example of the holding unit according to the embodiment of the present disclosure.
Figure 15B:
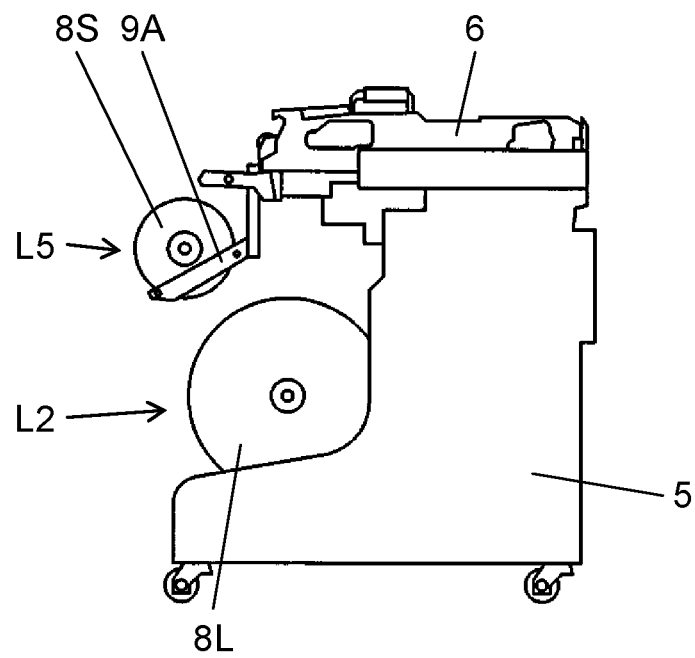
FIG. 15B is a diagram for illustrating another example of the holding unit according to the embodiment of the present disclosure.

Next, another example of the holding unit will be described with reference to FIGS. 15A and 15B. In FIG. 15A, suspended reel holding unit 9A that can hold small component reel 8S is mounted on a lower portion of insertion port 6a side of tape feeder 6. Suspended reel holding unit 9A is detachably mounted on automatic load feeder 6A and manual load feeder 6M. A position of suspended reel holding unit 9A mounted on tape feeder 6 mounted on carriage 5 is referred to as fifth holding row L5. Carriage 5 and suspended reel holding unit 9A mounted on tape feeder 6 mounted on carriage 5 constitute another holding unit having plurality of holding rows L1, L2, and L5.

In FIG. 15A, small component reels 8S can be held in first holding row L1 and second holding row L2 at the position of slot S that holds small component reel 8S in fifth holding row L5. In FIG. 15B, when large component reel 8L is held in second holding row L2 at the position of slot S that holds small component reel 8S in fifth holding row L5, component reel 8 cannot be held in first holding row L1.

In this way, in the another holding unit, when suspended reel holding unit 9A is mounted on tape feeder 6, tape feeder 6 can hold component reel 8, and when suspended reel holding unit 9A is not mounted, tape feeder 6 cannot hold component reel 8. That is, unit disposition determining unit 37 determines an interval at which tape feeder 6 constituting component supply unit U is disposed in the another holding unit based on whether or not tape feeder 6 constituting component supply unit U can hold component reel 8 and determines the component supply unit disposition. When the another holding unit is used, holding unit information 31d and constraint condition information 31f corresponding to the another holding unit are used.

As described above, management computer 13 according to the present embodiment is an apparatus for determining disposition of a component supply unit, which determines component supply unit disposition in which component supply unit U is disposed in the holding unit, the apparatus including information acquiring unit 35 that acquires component supply unit information 31e including information on the number of component reels 8 constituting component supply unit U and constraint condition information 31f including information on a layout that can be selected when component supply unit U is disposed in the holding unit, and unit disposition determining unit 37 that determines the component supply unit disposition based on constraint condition information 31f and the information on the number of component reels 8. Accordingly, optimum disposition of component supply unit U configured with component reel 8 and tape feeder 6 can be determined.

In the above description, it is understood by those skilled in the art that, although there are two kinds of component reels 8, including small component reel 8S and large component reel 8L, depending on the reel diameter, the reel diameter of component reel 8 is not limited to the two kinds. Even when three or more kinds of component reels 8 are included, optimum disposition of component supply unit U can be determined. Further, it is understood by those skilled in the art that even when there are three or more component reels 8 constituting component supply unit U, a modification example of carriage 5, reel holder 20, and suspended reel holding unit 9A constituting the holding unit belongs to the scope of the present disclosure.

Further, a combination of component reel 8 and tape feeder 6 constituting component supply unit U may be set in advance or an appropriate combination may be determined based on production data 31*a*. When the combination may be set in advance, combined tape feeder 6 is determined based on resource information 31*c* on component reel 8 in addition to feeder type information used for resource information 31*c* on component reel 8. Further, when the combination is determined based on production data 31*a*, the number of components used is predicted based on the number of produced boards 3 and a component name (a type) of a component mounted on board 3. When it is determined based on resource information 31*c* that additional supply to component reel 8 is required, automatic load feeder 6A is combined, and when it is determined that the additional supply to component reel 8 is not required, manual load feeder 6M is combined, and tape feeder 6 to be combined is determined.

A method of determining disposition of a component supply unit and an apparatus for determining disposition of a component supply unit according to the present disclosure have an effect that optimum disposition of the component supply unit including a component reel and a tape feeder can be determined, and are useful in a field of mounting a component on a board.

What is claimed is:

1. A method of determining disposition of a component supply unit including a plurality of component reels each obtained by winding a component accommodating tape accommodating a component and a tape feeder that supplies the component accommodating tape drawn out from each of the component reels, for determining component supply unit disposition in which the component supply unit is disposed in a holding unit that holds the component supply unit, the method comprising:
   acquiring component supply unit information including information on a number of the component reels and information on reel diameters of the component reels, and constraint condition information including information related to a layout that is capable of being selected when the component supply unit is disposed in the holding unit; and
   determining the component supply unit disposition, based on the constraint condition information, and the information on the number of the component reels and the information on the reel diameters of the component reels.

2. The method of determining disposition of a component supply unit of claim 1, further comprising:
   determining an interval at which the tape feeder is disposed in the holding unit, based on the information on the number of the component reels.

3. A method of determining disposition of a component supply unit including a plurality of component reels each obtained by winding a component accommodating tape accommodating a component and a tape feeder that supplies the component accommodating tape drawn out from each of the component reels, for determining component supply unit disposition in which the component supply unit is disposed in a holding unit that holds the component supply unit, the method comprising:
   acquiring component supply unit information including information on a number of the component reels and constraint condition information including information related to a layout that is capable of being selected when the component supply unit is disposed in the holding unit; and
   determining the component supply unit disposition, based on the constraint condition information and the information on the number of the component reels,
   wherein the component supply unit information includes information on a-reel diameters of the component reels, and
   wherein the method further comprises determining an interval at which the tape feeder is disposed in the holding unit, based on the information on the reel diameters of the component reels.

4. The method of determining disposition of a component supply unit of claim 3,
   wherein the holding unit has a plurality of holding rows, each of the plurality of holding rows holding one or more different ones of the component reels, and
   wherein the method further comprises determining the interval at which the tape feeder is disposed in the holding unit, based on the reel diameters of the component reels.

5. The method of determining disposition of a component supply unit of claim 1, further comprising:
   determining an interval at which the tape feeder is disposed in the holding unit, based on whether or not the tape feeder is capable of holding the component reels.

6. The method of determining disposition of a component supply unit of claim 1,
   wherein the tape feeder includes an automatic load feeder that automatically switches and supplies the component accommodating tape drawn out from each of the component reels.

7. The method of determining disposition of a component supply unit of claim 1, further comprising:
   displaying the component supply unit disposition.

8. An apparatus for determining disposition of a component supply unit including a plurality of component reels each obtained by winding a component accommodating tape accommodating a component and a tape feeder that supplies the component accommodating tape drawn out from each of the component reels, for determining component supply unit disposition in which the component supply unit is disposed in a holding unit that holds the component supply unit, the apparatus comprising:
   an information acquiring unit that acquires component supply unit information including information on a number of the component reels and information on reel diameters of the component reels, and constraint condition information including information related to a layout that is capable of being selected when the component supply unit is disposed in the holding unit; and
   a unit disposition determining unit that determines the component supply unit disposition, based on the constraint condition information, the information on the number of the component reels and the information on the reel diameters of the component reels.

9. The apparatus for determining disposition of a component supply unit of claim 8,
   wherein the unit disposition determining unit determines an interval at which the tape feeder is disposed in the holding unit, based on the information on the number of the component reels.

10. An apparatus for determining disposition of a component supply unit including a plurality of component reels each obtained by winding a component accommodating tape accommodating a component and a tape feeder that supplies the component accommodating tape drawn out from each of the component reels, for determining component supply unit disposition in which the component supply unit is disposed in a holding unit that holds the component supply unit, the apparatus comprising:

an information acquiring unit that acquires component supply unit information including information on a number of the component reels and constraint condition information including information related to a layout that is capable of being selected when the component supply unit is disposed in the holding unit; and a unit disposition determining unit that determines the component supply unit disposition, based on the constraint condition information and the information on the number of the component reels, wherein the component supply unit information includes information on a-reel diameters of the component reels, and wherein the unit disposition determining unit determines an interval at which the tape feeder is disposed in the holding unit, based on the information on the reel diameters of the component reels.

11. The apparatus for determining disposition of a component supply unit of claim 10, wherein the holding unit has a plurality of holding rows, each of the plurality of holding rows holding one or more different ones of the component reels, and wherein the unit disposition determining unit determines the interval at which the tape feeder is disposed in the holding unit, based on the reel diameters of the component reels.

12. The apparatus for determining disposition of a component supply unit of claim 8, wherein the unit disposition determining unit determines an interval at which the tape feeder is disposed in the holding unit, based on whether or not the tape feeder is capable of holding the component reels.

13. The apparatus for determining disposition of a component supply unit of claim 8, wherein the tape feeder includes an automatic load feeder that automatically switches and supplies the component accommodating tape drawn out from each of the component reels.

14. The apparatus for determining disposition of a component supply unit of claim 8, further comprising:

a display unit that displays the component supply unit disposition.

* * * * *